May 8, 1928.

E. W. STEVENS 1,668,830

FLUID PRESSURE PERCUSSIVE DRILL

Filed Dec. 18, 1925

INVENTOR.
Edward W. Stevens
BY
Ira L. Nickerson
his ATTORNEY.

Patented May 8, 1928.

1,668,830

UNITED STATES PATENT OFFICE.

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY.

FLUID-PRESSURE PERCUSSIVE DRILL.

Application filed December 18, 1925. Serial No. 76,278.

This invention relates to fluid pressure tools of the percussive type used for mining, quarrying and similar operations and commonly referred to as rock drills.

Machines of the type described provide some form of mechanism for rotating the drill steel. The usual arrangement is to produce rotation of the hammer piston as it reciprocates and to transmit this rotary motion through certain keyed parts to the chuck in which the shank of the drill steel is supported. The intense vibration developed by certain parts of the machine when the latter is in operation, particularly after the parts have become somewhat worn, tends to produce crystallization with the result that breakage occurs. The parts thus subject to breakage require considerable machining and their replacement is accordingly a matter of considerable expense.

Among the objects of the invention are to reduce the breakage of expensive parts in machines of the type described, to minimize and localize the effects of vibration, and in general to improve prior devices in the interests of more satisfactory service.

Figure 1:
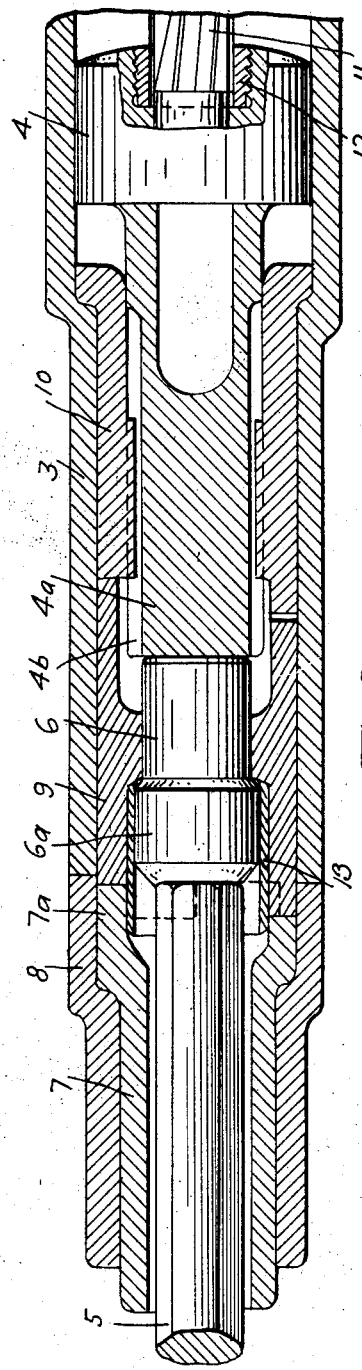
Figure 2:
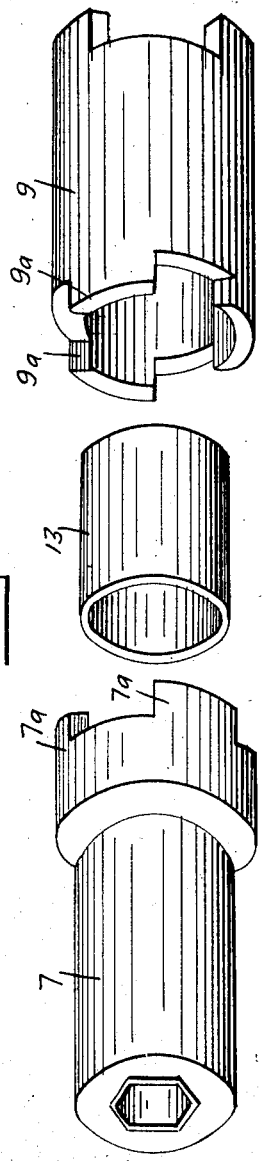

In order to illustrate the invention one concrete embodiment thereof is shown in the accompanying drawing in which:

Fig. 1 is a longitudinal sectional view through a portion of a fluid pressure percussive drill; and Fig. 2 is a perspective view of certain of the parts shown in Fig. 1.

The preferred embodiment of the invention is shown in Fig. 1 which discloses in section so much of a fluid pressure percussive drill as will serve to illustrate the invention. The drill therein shown comprises a cylinder 3 having a piston chamber in which reciprocates a hammer piston 4 imparting blows to a working tool or drill steel 5 either directly or through a movable impact member in the form of an anvil block 6 interposed between the steel 5 and the impact end 4ª of the piston. The shank of the drill steel 5 is received in a chuck 7 mounted for rotative movement in a front head 8 secured to the drill cylinder 3 in any suitable manner (not shown). The anvil block 6 is supported in a bushing 9 arranged for rotative movement in the drill cylinder 3, the bushing being keyed to the chuck 8 by any suitable means such as interengaging parts or teeth 7ª and 9ª respectively. Bushing 9 is also keyed in a similar manner to the guide sleeve 10 for the impact end 4ª of the piston, sleeve 10 having grooves receiving splines 4ᵇ on the piston. Any known or desired means may be utilized for imparting rotative movement to piston 4 such as the rifle bar 11 and the rifle nut 12. The rotative movement imparted by these last named parts to the piston 4 is transmitted through splines 4ᵇ to the sleeve 10, and then to the bushing 9 and to the chuck 7, and by the latter to the shank of the drill steel 5.

Since the anvil block 6 is more or less loose and this looseness is increased by wear a vibratory or hammering effect is produced by the head 6ª of the block upon the abutting portions of chuck 7 and bushing 9 comprising particularly the interengaging teeth 7ª and 9ª. In order to prevent crystallization and breakage of these parts suitable cheap and readily renewable means are provided for guiding and taking the wear of the head 6ª. A preferred means for this purpose comprises a liner bushing 13 in telescoping relation with the chuck 7 and the bushing 9, having a light press fit with the same, and covering the interfitting parts 7ª and 9ª thereof. With this construction any breakage in the front head resulting from the vibration of the anvil block 6 is confined to the liner 13 which is inexpensive as well as easy to renew. Moreover, the liner 13 being positioned opposite the joint between the cylinder 3 and the front head 8 serves to maintain the interengaged bushing 9 and chuck 7 in alignment and to reduce relative movement of the same.

Inasmuch as the purpose of the present disclosure is illustrative only, it is to be understood that the invention is not limited to the specific details thereof but covers all forms coming within the scope of the appended claims.

I claim:

1. In a drill of the percussive type, in combination, a movable impact member, a bushing for said member arranged for rotative movement, a chuck to receive the shank of the drill steel, said chuck and said bushing having interfitting parts whereby rotation of the latter is transmitted to the former, and a liner bushing covering the joint between said chuck and said first named bushing and taking the wear of said impact member.

2. In a fluid pressure drill of the percussive type having a cylinder, a hammer piston reciprocable therein, a front head for said cylinder, a chuck in said head to receive the shank of the drill steel, an anvil block interposed between said piston and the drill steel, a bushing for said block in said cylinder, said chuck and said bushing being in abutting relation, and a liner bushing telescoping within both said shank and said anvil bushing and serving as a guide for the head of the anvil block.

3. In a fluid pressure drill of the percussive type having a cylinder, a hammer piston reciprocable therein, a front head for said cylinder, a chuck in said head to receive the shank of the drill steel, an anvil block interposed between said piston and the drill steel, a bushing for said block in said cylinder, means imparting rotation to said piston during its movement in one direction, means for transmitting the rotative movement of said piston through said bushing to said chuck, and a liner bushing in telescoping relation with both said chuck and said anvil bushing and serving as a guide for the head of said anvil block.

4. In a fluid pressure drill of the percussive type having a cylinder, a hammer piston reciprocable therein, a front head for said cylinder, a chuck in said head to receive the shank of the drill steel, an anvil block interposed between said piston and the drill steel, a bushing for said block in said cylinder, means imparting rotation to said piston during its movement in one direction, and means including interengaging projections on said chuck and said bushing for transmitting such rotative movement to the drill steel, and a liner bushing covering the joint between said chuck and said anvil bushing taking the wear of the head of said anvil block.

5. In a drill of the percussive type, in combination, a member arranged to receive blows and transmit the same to a working tool, means for supporting the working tool in position to be contacted by said member, a guide bushing for said member, and means in telescoping relation with said first-named means and with said bushing for maintaining the same in alignment and for taking the wear of said member.

6. In a drill of the percussive type, in combination, a member arranged to receive blows and transmit the same to a working tool, said member having a head and a stem, a chuck for supporting the working tool in position to be contacted by the head of said member, a guide bushing for the stem of said member, and a liner bushing in inner telescoping relation with said chuck and said guide bushing and arranged to take the wear of the head of said member.

7. In a drill having a percussive motor in combination, an anvil block arranged to receive the blows of the percussive motor and transmit the same to a working tool, said anvil block having a head and a stem, a chuck for supporting the shank of the working tool in position to be contacted by said head, a guide bushing for said stem, said bushing and said chuck being in abutting relation, and a liner bushing receiving the head of said anvil block and in telescoping relation with both said chuck and said guide bushing.

Signed by me at Detroit, Michigan, this 15 day of December, 1925.

EDWARD W. STEVENS.